(12) United States Patent
Suzuki et al.

(10) Patent No.: US 8,203,771 B2
(45) Date of Patent: Jun. 19, 2012

(54) CONTROL METHOD FOR IMAGE READING SYSTEM

(75) Inventors: Nobukazu Suzuki, Yokohama (JP); Yusuke Hattori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 278 days.

(21) Appl. No.: 11/862,028

(22) Filed: Sep. 26, 2007

(65) Prior Publication Data

US 2008/0144123 A1 Jun. 19, 2008

(30) Foreign Application Priority Data

Dec. 13, 2006 (JP) .................................. 2006-336363

(51) Int. Cl.
*G06F 3/12* (2006.01)
*H04N 1/46* (2006.01)

(52) U.S. Cl. ....................................... 358/537; 358/1.13

(58) Field of Classification Search ......................... None
See application file for complete search history.

(56) References Cited

U.S. PATENT DOCUMENTS

| 5,652,663 A * | 7/1997 | Zelten | 358/447 |
| 6,069,707 A * | 5/2000 | Pekelman | 358/1.6 |
| 6,980,332 B2 * | 12/2005 | Simske | 358/445 |
| 7,142,335 B2 * | 11/2006 | Tesavis | 358/474 |
| 7,199,909 B2 * | 4/2007 | Han et al. | 358/474 |
| 2003/0016376 A1 * | 1/2003 | Narushima | 358/1.13 |
| 2004/0190034 A1 | 9/2004 | Ozawa | |
| 2004/0196503 A1 | 10/2004 | Kurtenbach | |

FOREIGN PATENT DOCUMENTS

| CN | 1533149 A | 9/2004 |
| CN | 1536434 A | 10/2004 |
| JP | 2001-111748 A | 4/2001 |
| JP | 2004-221826 A | 8/2004 |
| JP | 2005-311947 A | 11/2005 |

* cited by examiner

*Primary Examiner* — Twyler Haskins
*Assistant Examiner* — Barbara Reiner
(74) *Attorney, Agent, or Firm* — Canon USA Inc. IP Division

(57) ABSTRACT

In a control method for an image reading system comprising an image scanning apparatus selectively reading an original as a reflective or transmissive original, an image processing apparatus receiving image data read by the image scanning apparatus and executing image processing of the image data, an operating unit, and a display unit. The control method includes determining whether the original is the reflective or transmissive original, executing reading of the reflective or transmissive original based on the determination result, processing the read image data, displaying details of processing executed and the image processing, and inputting an instruction to change the details of displayed processing. When the change instruction input instructs change of a process under execution or having been already executed, the image processing is executed again from the changed process.

8 Claims, 9 Drawing Sheets

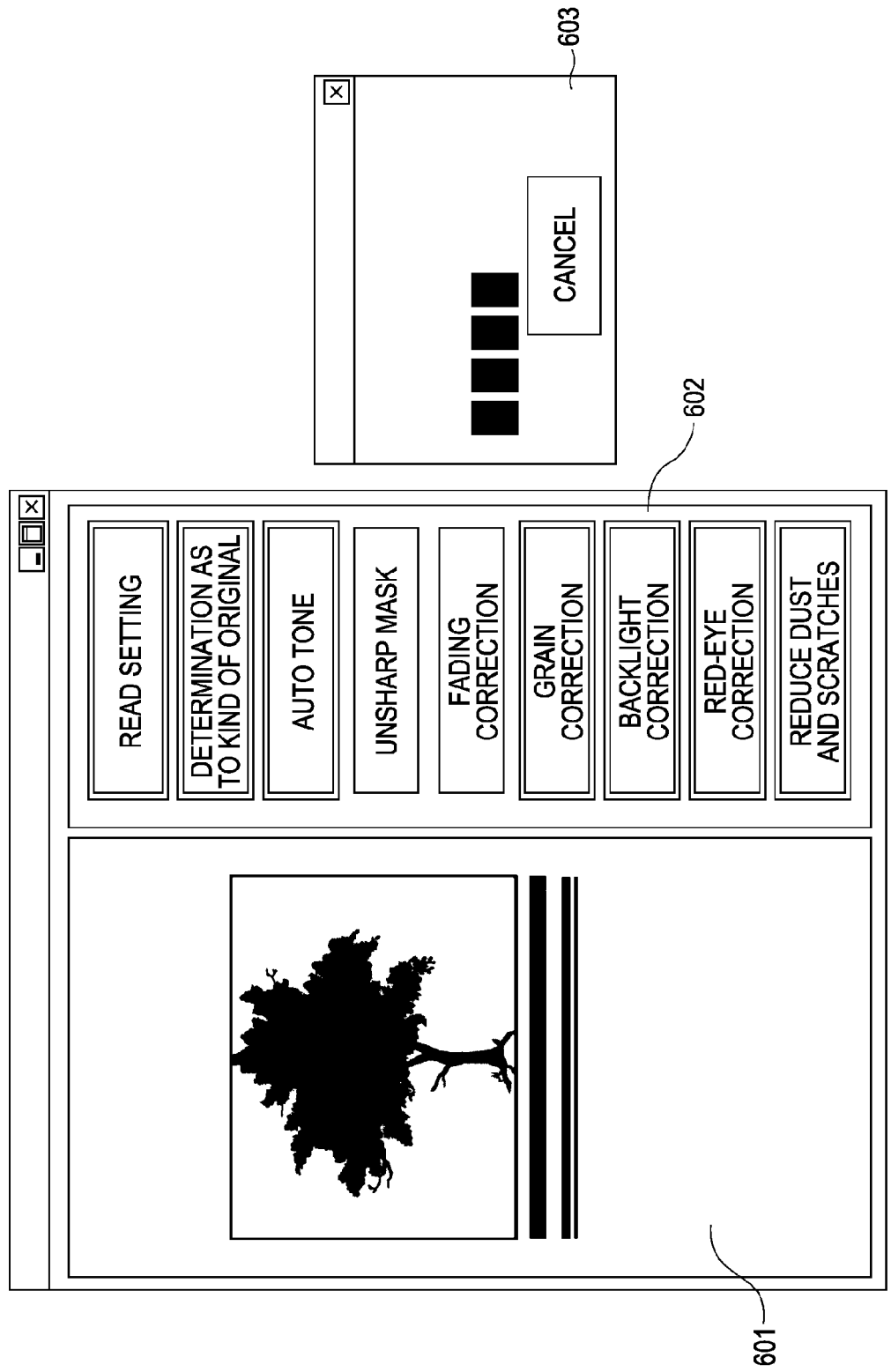

CONTROL METHOD FOR IMAGE READING SYSTEM

BACKGROUND OF THE INVENTION

1. Field of the Invention

The present invention relates to a control method for an image reading system in which an image obtained by scanning an original is read by an image sensor for conversion to an electric image signal, and the electric image signal is converted to a digital image signal by an A/D converter for transfer to an external device.

2. Description of the Related Art

The above-mentioned type of image reading system has recently been designed such that a user can select the kind of an original (e.g., a photo, a text document, or a film) to be read and can cut out (clip) a portion of an original image required for the reading while a preview of the original is displayed. Necessary image processing is executed in match with the required image portion and main reading of the image is performed after the user has confirmed the result of the image processing based on the displayed preview.

In order to allow the user to more easily perform the image reading, Japanese Patent Laid-Open No. 2005-311947, for example, proposes auto-mode reading in which the above-described process is executed in a fully automatic manner.

With the proposed related art, however, a fairly long time is required to automatically determine the kind of an original by the auto-mode reading in which the original is read without requiring the user to perform any more operation than just pressing a scan button. Another problem is that the determination result may be a different kind of original from the actual one in some cases.

For example, with a scanner arrangement at a current level, different lamps are turned on between when a reflective original is read and when a transmissive original is read. It is therefore required to determine whether the original to be read is a reflective original or a transmissive original.

In a currently prevailing scanner, because the determination as to whether the original to be read is a reflective original or a transmissive original is made by using data read by a CCD sensor, a light source has to be stabilized before start of the reading by the CCD sensor. More specifically, because a fluorescent lamp is used as the light source, the light source has to be stabilized at the time of turning-on thereof and about 1 minute is required to stabilize the light source. Hence, a time of 1 minute or longer is required until the kind of the original is automatically determined after power-on of the scanner. In other words, the currently prevailing scanner has a problem that the time required to automatically determine the kind of the original is fairly long.

The auto-mode is convenient in that the image processing is automatically executed after scanning and reading the original without requiring any operation by the user. However, the image processing not demanded by the user is also executed in some cases. Such a case causes a problem of requiring a longer processing time than expected by the user.

Another problem with the auto-mode is that the result of executing the image processing may provide an image differing from that desired by the user.

Still another problem with the auto-mode is that the result of automatically determining the kind of the original may differ from the actual kind of the original expected by the user.

SUMMARY OF THE INVENTION

The present invention is directed to a control method for an image reading system which can shorten the time required to automatically determine the kind of an original and which can avoid execution of image processing not demanded by a user.

According to an aspect of the present invention, a control method is provided for an image reading system comprising an image scanning apparatus configured to be able to selectively read an original placed on an original plate as a reflective original or a transmissive original, an image processing apparatus configured to receive image data read by the image scanning apparatus and to execute image processing of the image data, and an operating unit and a display unit configured to be able to operate the image scanning apparatus and the image processing apparatus. The control method includes determining whether the original placed on the original plate is the reflective original or the transmissive original; executing reading of image data from the reflective original or the transmissive original based on a result of the determination; processing the read image data read; displaying, in the display unit, details of processing executed in the determining and the image processing; and inputting an instruction to change the details of displayed processing. And when the change instruction input instructs change of a process under execution or having been already executed, the image processing is executed again from the changed process.

And according to another aspect of the present invention, a control method is provided for an image reading system comprising an image scanning apparatus configured to read an original and to obtain image data, an image processing apparatus configured to execute image processing of the image data, and an operating unit and a display unit configured to be able to operate the image scanning apparatus and the image processing apparatus. The control method includes reading the original by the image scanning apparatus; setting, based on the image data read in the reading step, details of the image processing executed on the image data; processing the image data in accordance with the set details set; displaying the set details; and inputting an instruction for change of the setting based on display of the details. And when the change instruction input instructs change of setting for a process under execution or having been already executed, the image processing is executed again from the setting-changed process, and when the change instruction input instructs change of setting for a process to be executed subsequently, the image processing is executed in accordance with the changed setting.

Further features and aspects of the present invention will become apparent from the following description of exemplary embodiments with reference to the attached drawings.

BRIEF DESCRIPTION OF THE DRAWINGS

FIG. 9 illustrates an example user interface of a driver application, which is presented during image reading by the scanner main unit in the third exemplary embodiment.

DESCRIPTION OF THE EMBODIMENTS

Several exemplary embodiments of the present invention will now herein be described below.

First Exemplary Embodiment

Figure 1:
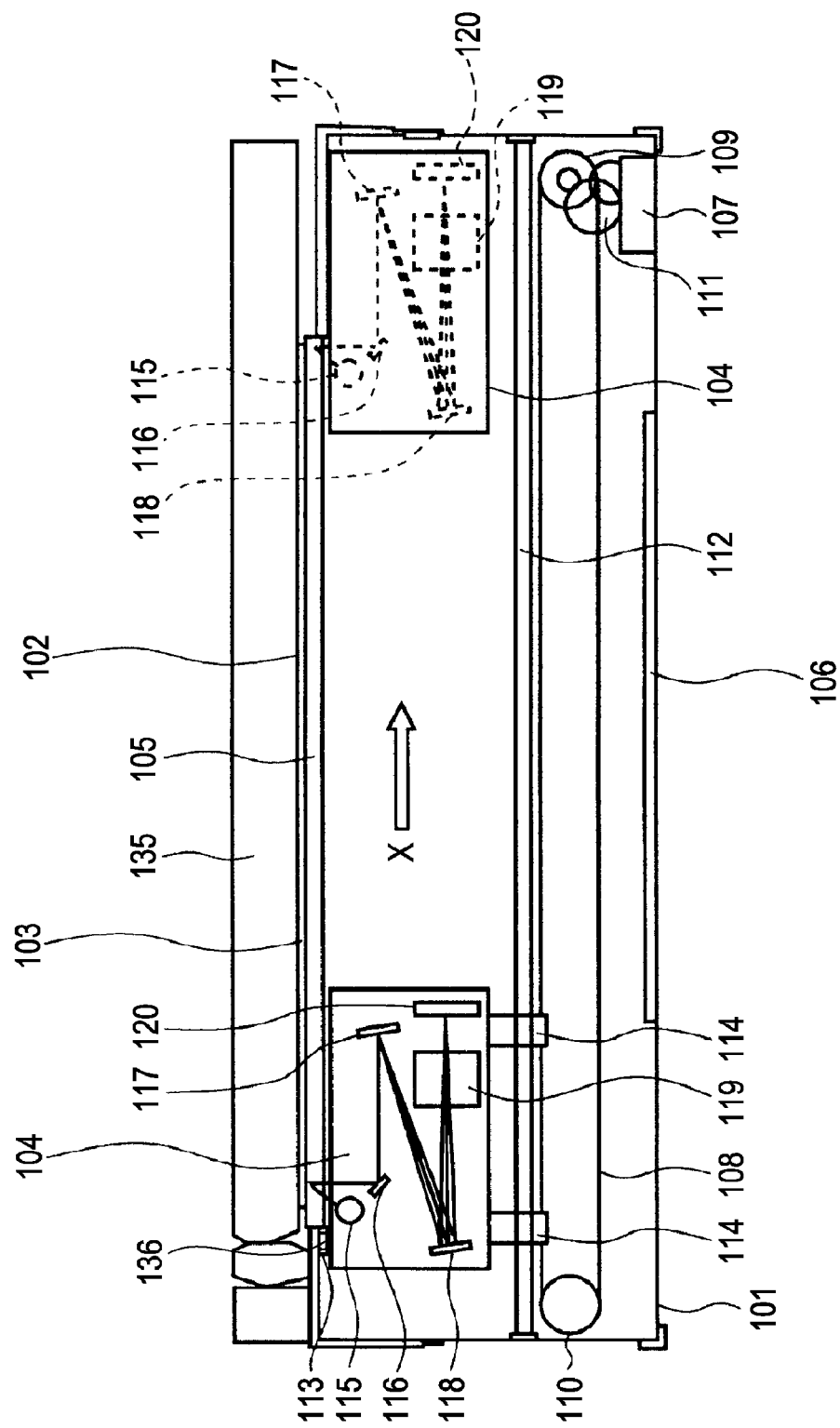
FIG. 1 is a sectional view of an example image scanning apparatus according to a first exemplary embodiment of the present invention.

FIG. 1 is a sectional view of an example image scanning apparatus 100 according to a first exemplary embodiment of the present invention.

The image scanning apparatus 100 includes a scanner main unit 101 and a transmissive original unit 102. The scanner main unit 101 is connected to a host computer (hereinafter referred to as a "host PC") via an interface cable (not shown).

The scanner main unit 101 includes a moving optical unit 104, an original plate glass 105, an electric board 106, a pulse motor 107, an endless belt 108, pulleys 109 and 110, a gear train 111, a guide rail 112, and a white reference plate 113.

A black mark 136 is formed on the white reference plate 113. The scanner main unit 101 determines a read area based on the black mark 136 as a reference and reads an image.

The moving optical unit 104 and the pulse motor 107 are electrically connected to each other via a cable (not shown). Further, the moving optical unit 104 is mounted to a carriage 114 and is slidable together with the carriage 114 through the guide rail 112. The carriage 114 is fixed to the endless belt 108.

The moving optical unit 104 includes a reflective original light source 115, a plurality of reflecting mirrors 116, 117 and 118, an imaging lens 119, and a line sensor 120 which serves as an image pickup unit.

An example operation of reading an image on a reflective original in the scanner main unit 101 will be described next. The reading operation in the scanner main unit 101 is started by a read instruction command input from the host PC. The scanner main unit 101 turns on the reflective original light source 115 of the moving optical unit 104. Reflected light from a scanned original 103 is reflected by the plurality of reflecting mirrors 116, 117 and 118, and is focused on the line sensor 120 through the imaging lens 119. An image of one line in the direction of main scanning is read in such a manner.

Motive power of the pulse motor 107 rotates the pulley 109 through the gear train 111 to drive the endless belt 108. As a result, the optical unit 104 fixedly mounted to the carriage 114 through the endless belt 108 is moved over the guide rail 112 in the direction of sub-scanning, which is indicated by an arrow X.

The scanner main unit 101 repeats the reading of a line image in the direction of main scanning while intermittently moving the optical unit 104 in the direction of sub-scanning.

The scanner main unit 101 can perform the scanning over an entire surface of the original plate glass 105 by moving the optical unit 104 up to a position indicated by dotted lines in FIG. 1, while continuing the reading operation. Also, the scanner main unit 101 can read a partial image of the original placed on the original plate glass 105 in accordance with particulars of the read command input from the host PC. In the latter case, an image read range is determined by a user selecting an image region to be read based on a previewed image on a display (monitor) of the host PC, which is obtained by pre-scanning the original. Then, the host PC takes in an image in the determined image read range.

Figure 2:
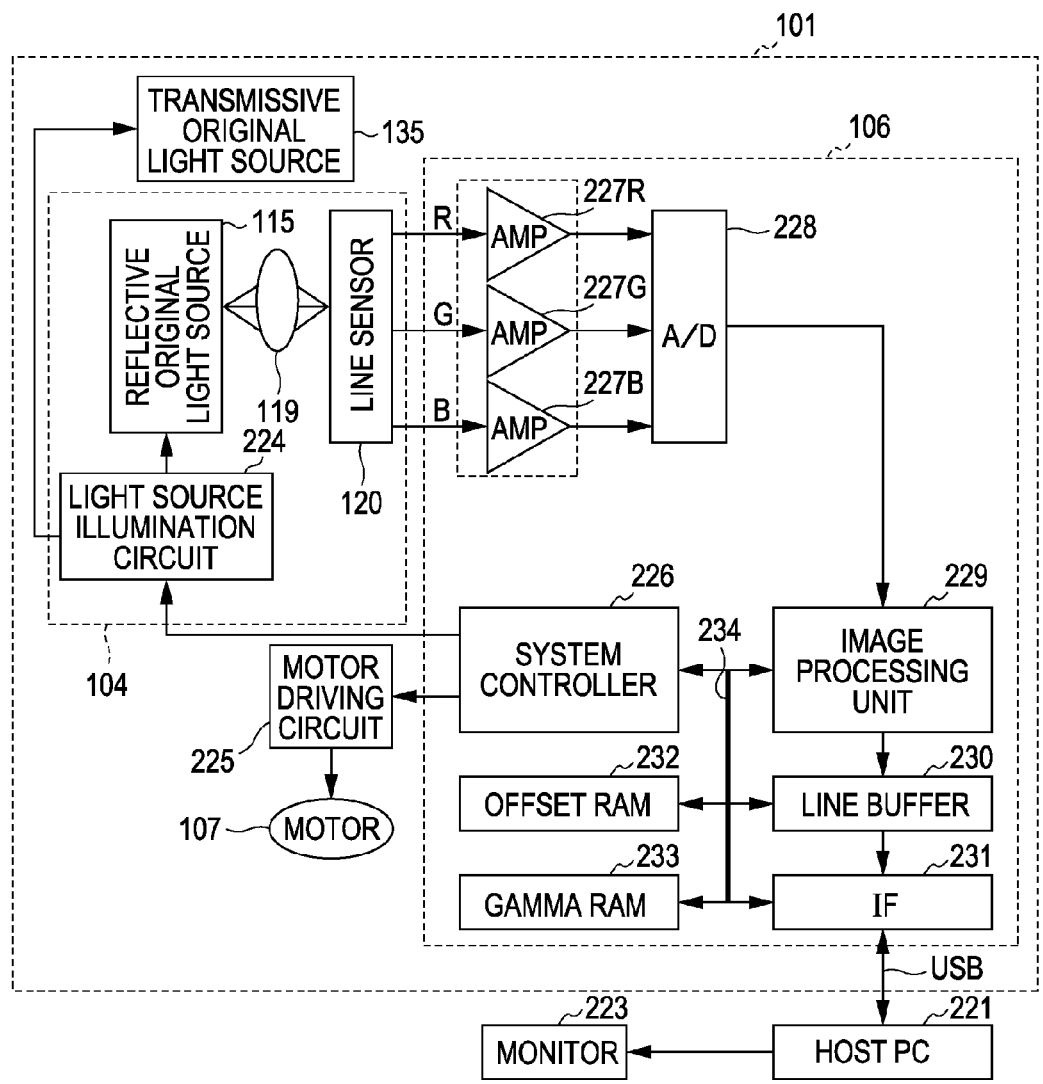
FIG. 2 is a block diagram showing an example functional configuration of a scanner main unit in the first exemplary embodiment.

FIG. 2 is a block diagram primarily showing a functional configuration of the scanner main unit 101 in the first exemplary embodiment. The same components as those shown in FIG. 1 are denoted by the same reference numerals.

In the optical unit 104, a light source illumination circuit 224 selectively turns on a reflective original light source 115 and a transmissive original light source 135, and it includes a detection unit arranged to detect the quantity of light emitted from each light source. When a cold cathode tube is used as each of the reflective original light source 115 and the transmissive original light source 135, the so-called inverter circuit is employed.

The electric board 106 includes analog gain adjusters (AMPs) 227R, 227G and 227B capable of variably amplifying analog image signals which are output from the line sensor 120.

An A/D converter 228 converts the analog image signals output from the analog gain adjusters 227R, 227G and 227B to digital image signals.

An image processing unit 229 executes image processing of the converted digital image signals, such as offset correction, shading correction, digital gain adjustment, color balance adjustment, masking, resolution conversion in each of the directions of main scanning and sub-scanning, and image compression.

A line buffer 230 temporarily stores image data and is constituted by using a universal random access memory. An interface (IF) 231 is used for communication with a host PC 221. While the interface 231 is constituted as a USB interface in the first exemplary embodiment, another type of interface, e.g., IEEE 1394, can also be used.

An offset RAM 232 is used as a working area when the image processing is executed. Because the line sensor 120 includes RGB line sensors arranged in parallel with a predetermined offset between two line sensors, the offset RAM 232 is used for correction of the offset between two of the RGB line sensors. Further, the offset RAM 232 temporarily stores various data used for the shading correction, etc. In the first exemplary embodiment, the offset RAM 232 is constituted by using a universal random access memory.

A gamma RAM 233 is used to store a gamma curve and to execute the gamma correction. A system controller 226 stores an overall film scanner sequence and executes various kinds of control in accordance with instructions from the host PC 221.

A system bus (CPU bus) 234 interconnects the system controller 226, the image processing unit 229, the line buffer 230, the interface 231, the offset RAM 232, and the gamma RAM 233. The system bus 234 is constituted by an address bus and a data bus.

A motor drive circuit 225 is a drive circuit for the pulse motor 107 and outputs an excitation switching signal for the pulse motor 107 in accordance with a signal from the system controller 226 which serves as a system control unit for the scanner main unit 101.

An example general configuration of the host PC 221 used for control of the scanner main unit 101 will be described next.

Figure 3:
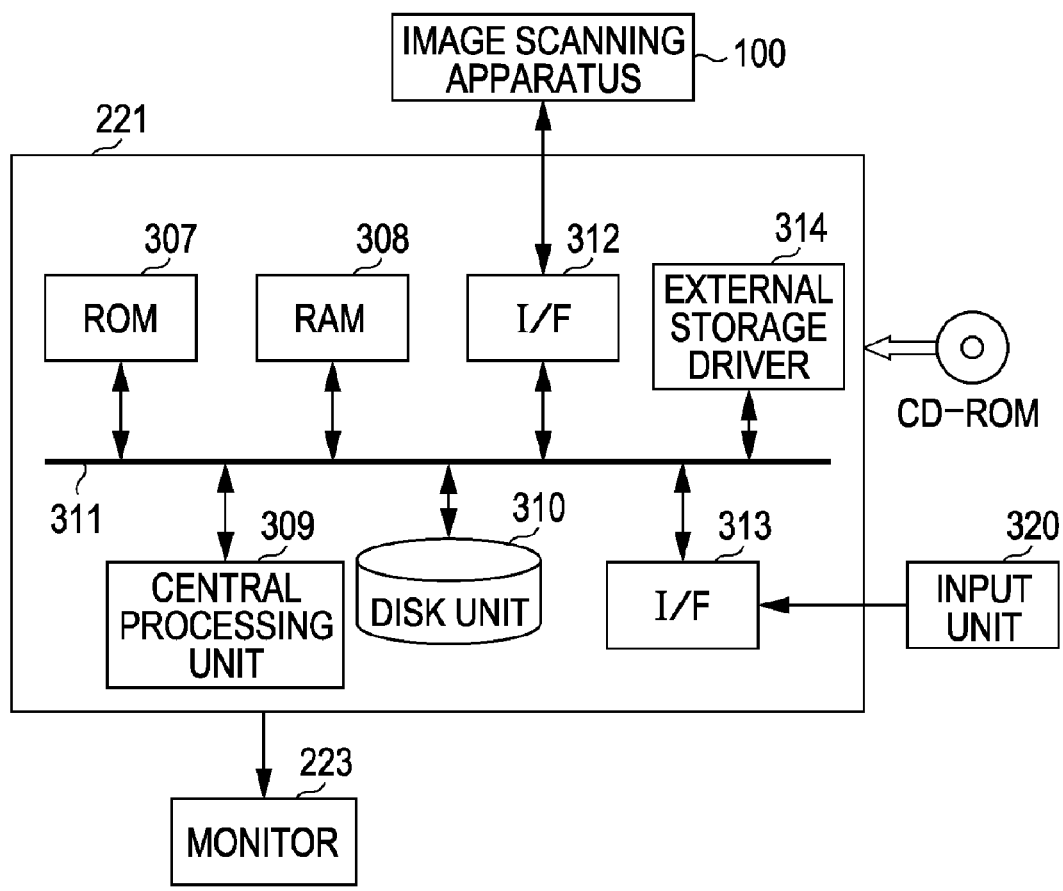
FIG. 3 is a block diagram of a host PC used for control of the scanner main unit in the first exemplary embodiment.

FIG. 3 is a block diagram of the host PC 221 used for control of the scanner main unit 101 in the first exemplary embodiment. The host PC 221 includes a ROM 307, a RAM 308, a central processing unit 309, a disk unit 310, a bus 311, an I/F 312, an I/F 313, and an external storage driver 314.

The ROM 307 holds programs for implementing control procedures executed in the first exemplary embodiment. The RAM 308 serves as a memory area and a work area which are required to perform operations in accordance with the programs. The central processing unit 309 executes processing in accordance with the programs held in the ROM 307.

The bus 311 interconnects the above-mentioned components such that data can be transferred among those components.

The I/F 312 is an interface for communication with the scanner main unit 101. While the interface 312 is constituted as a USB interface similarly to the I/F 231 in the scanner main unit 101, another type of interface, e.g., IEEE1394, can also be used. The I/F 313 is connected to an input unit 320 such as a mouse and a keyboard.

The external storage driver 314 drives an external storage medium such as a floppy disk and a CD-ROM. When the control programs are stored in some external storage medium, the external storage driver 314 reads and downloads the control programs from the external storage medium in stead of previously holding the control programs in the ROM 307 as described above. Though not shown, the control programs can also be downloaded via a network by providing a network connector.

Figure 4:
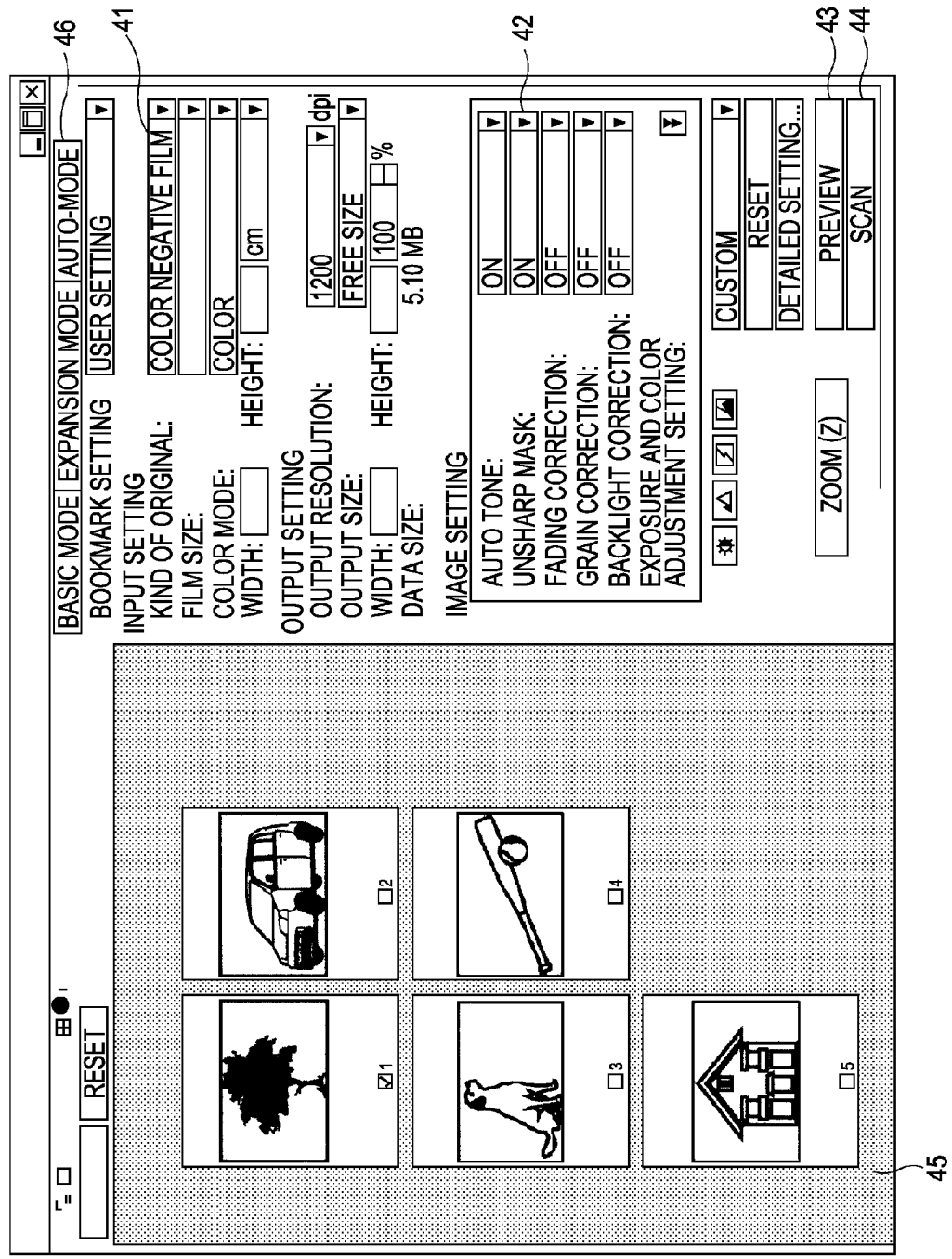
FIG. 4 illustrates an example user interface of driver software, which is installed in an external unit of the image scanning apparatus.

FIG. 4 illustrates a user interface C11 of driver software, which is installed in the host PC 221 as an external unit of the image scanning apparatus 100. The user interface C11 serves as a UI screen in cooperation with a display unit and an operating unit.

The user interface C11 of driver software includes a display region 41, an operation input region 42, buttons 43 and 44, a thumbnail display region 45, and a button 46.

The display region 41 serves as a region indicating an image reading method executed in the image scanning apparatus 100. The user can change over the image reading method executed in the image scanning apparatus 100 by selecting the kind of an original to be scanned.

The operation input region 42 serves as a region allowing the user to select kinds of image processing to be executed for an image. By selecting proper kinds of image processing, optimum image processing can be executed for the image.

The button 43 is used to preview an image, which is to be read into the host PC 221, in the thumbnail display region 45 for a film. The button 44 is used to read an image into the host PC 221. When the button 44 is pressed, the reading of an image into the host PC 221 is started.

When the button 46 is pressed, the type of an original to be read is automatically determined without requiring the user to select the type of the original while looking at the display portion 41 and to select the image processing to be executed by performing an input operation in the operation input portion 42. Further, with the pressing of the button 46, optimum image processing is executed for the original to be read, and the processed image is read into the host PC 221.

The reading operation in an auto-mode will be described next.

Figure 5:
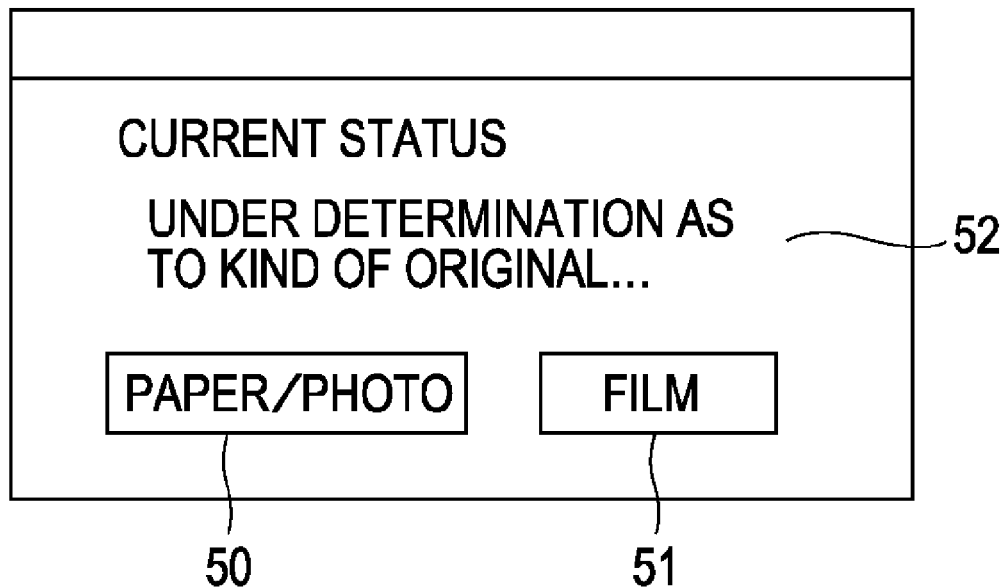
FIG. 5 illustrates another example user interface of the driver software, which is installed in the external unit of the image scanning apparatus.

FIG. 5 illustrates another user interface C12 of the driver software, which is installed in the external unit of the image scanning apparatus 100. The user interface C12 serves as a UI screen in cooperation with the display unit and the operating unit. The user interface C12 has kind-of-original display regions 50 and 51, and a processing status display region 52.

During the reading operation in the auto-mode, the user interface C12 shown in FIG. 5 is displayed on the host PC 221. The kind-of-original display regions 50 and 51 display different kinds of originals selectable by the user, respectively. Depending on the original to be read, the user can select the proper kind of the original. The processing status display region 52 displays the processing status executed by the driver software at that time during the reading operation in the auto-mode.

A control method for the reading operation in the image scanning apparatus 100 will be described next.

Figure 6:
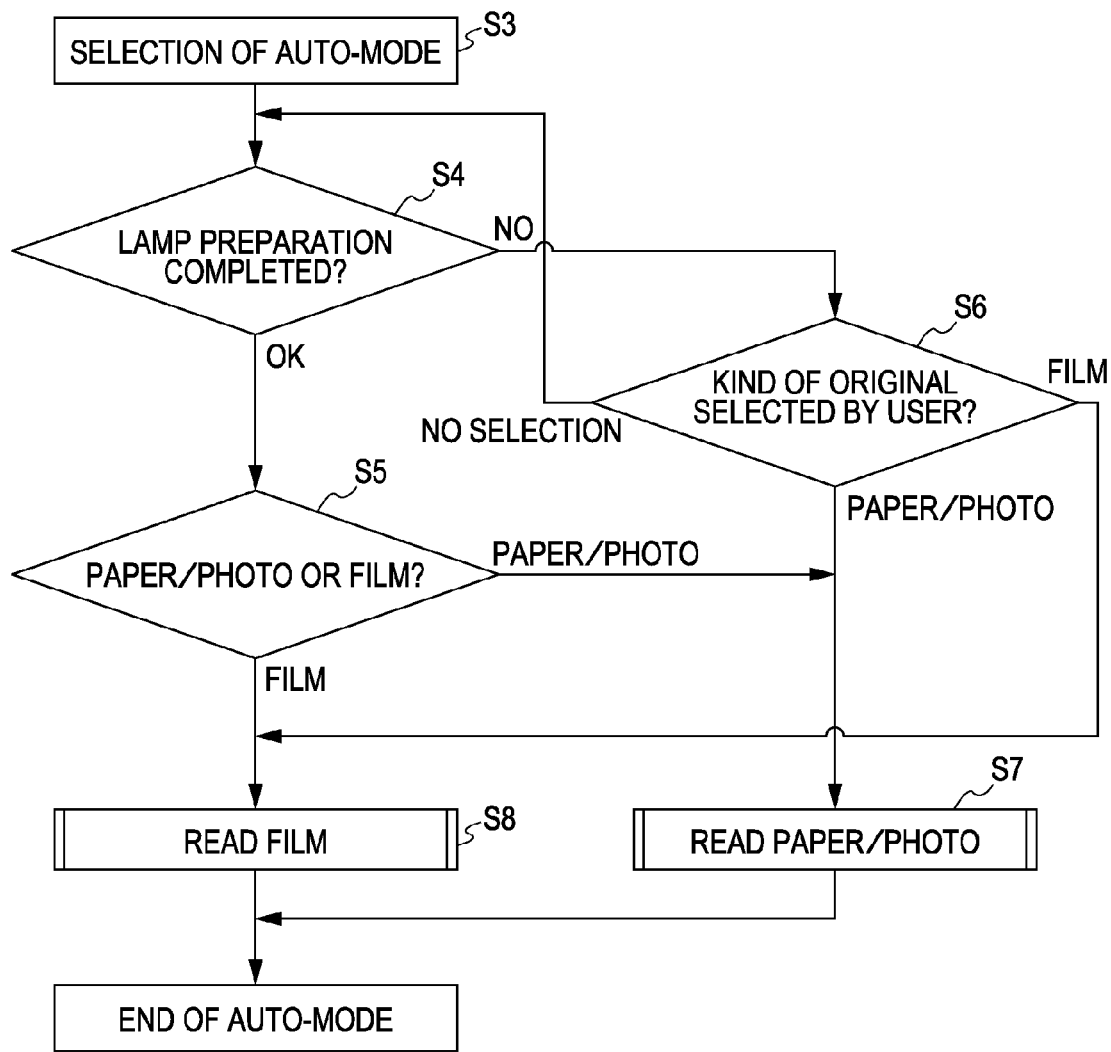
FIG. 6 is a flowchart of an example auto-mode process executed after an auto-mode is selected in the image scanning apparatus.

FIG. 6 is a flowchart of an example auto-mode process executed after the auto-mode is selected in the image scanning apparatus 100.

First, a power supply of the scanner main unit 101 is turned on. At that time, the scanner main unit 101 is initialized, for example, by determining a datum point for the image reading by the scanner main unit 101 so that the scanner main unit 101 is brought to a state ready for reading an image. The driver software for the scanner main unit 101 is started up in the host PC 221 that controls the scanner main unit 101. The user interfaces C11 and C12 of the driver software are displayed on a monitor 223 of the host PC 221, thus allowing the user to perform an input operation on the user interfaces through the input unit 320. On the driver-software user interface C11 displayed on the host PC 221, the user selects the auto-mode reading (S3).

When reading the image, it is checked whether an illumination lamp is in an appropriate state (S4). A time of 1 minute or longer is usually required until the preparation of the illumination lamp is completed. If the preparation of the illumination lamp is completed at S4, the processing advances to S5. If the preparation of the illumination lamp is not yet completed, the processing advances to S6 in which the user interface C12 of the driver software, shown in FIG. 5, is displayed. On the user interface C12, the user can select whether the original placed by the user is "paper/photo" or "film". In this case, the image reading is executed in an image read mode corresponding to the selected kind of the original.

When the user desires automatic image reading in the auto-mode, the user makes no selection in S6, whereupon the processing is returns to S4 so as to wait for the completion of the preparation of the illumination lamp.

If it is determined that the preparation of the illumination lamp is completed, whether the original is "paper/photo" or "film" is automatically determined in S5. More specifically, the original plate is scanned by the transmissive original light source or the reflective original light source. If the shape of a film holder is recognized, this means that the original is "film". Otherwise, the original is determined to be "paper/photo". If the original is determined to be "paper/photo", the paper/photo is read in S7. If the original is determined to be "film", the film is read in S8.

In the auto-mode reading described above, when a time-consuming automatic process, e.g., the process of automatically determining whether the original is a transmissive original or a reflective original, is executed, a button is prepared on a dialog (box) displaying the current status during a period in which the original is scanned in the auto-mode. That button allows the user to select switching from the automatic determination process to a manual operation performed by the user. In other words, even during the automatic determination process, the user can select the manual operation in a switching manner. After the switching, the original is scanned in accordance with the process selected by the user.

In the first exemplary embodiment described above, therefore, a processing time can be cut. In some other process consuming a time, a mode for skipping the relevant process can also be prepared in the dialog displaying the status of the ongoing process, as in the above-described automatic determination process, so that the original is scanned in accordance with the details of the processing selected by the user.

Thus, according to the first exemplary embodiment, since unnecessary image processing is not executed and an original is more quickly scanned, desired image processing can be realized without not only increasing the cost of the image scanning apparatus 100, but also changing the construction of the known image scanning apparatus.

Second Exemplary Embodiment

Figure 7:
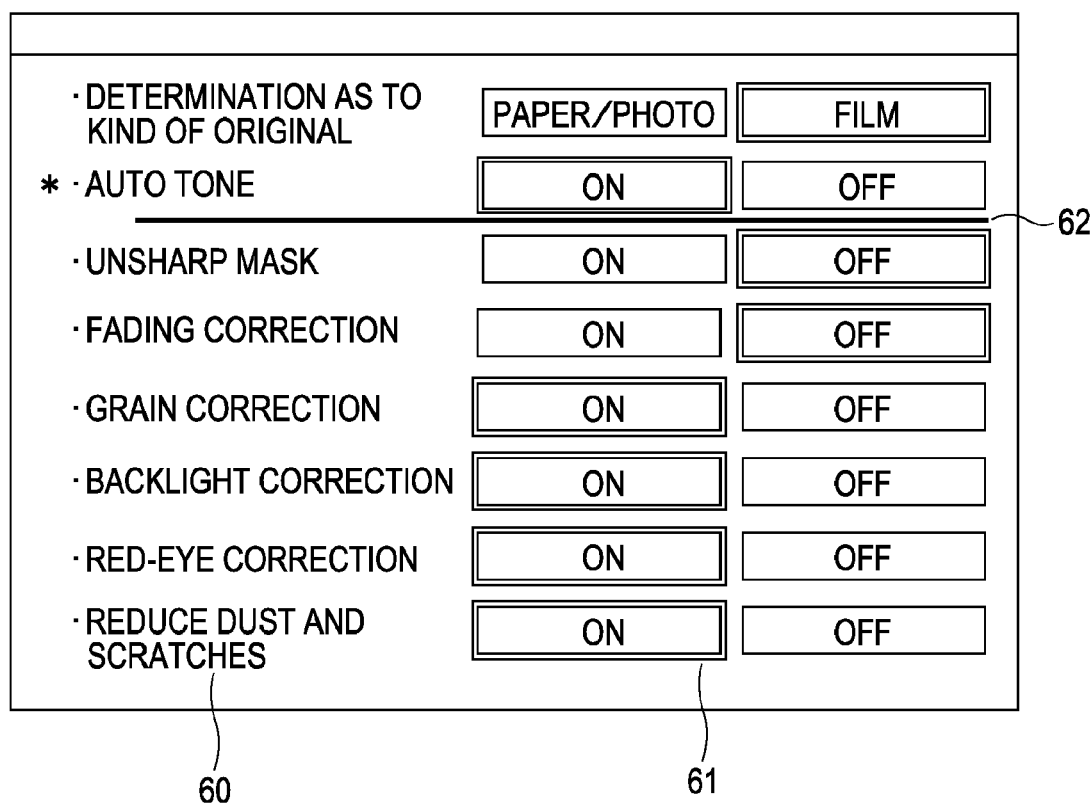
FIG. 7 illustrates an example user interface of a driver application for an image scanning apparatus according to a second exemplary embodiment of the present invention.

FIG. 7 illustrates a user interface C21 of a driver application for an image scanning apparatus 200 according to a second exemplary embodiment of the present invention.

The user interface C21 of the driver application for the image scanning apparatus 200 is displayed on the host PC 221 when the auto-mode reading is executed. The user interface C21 has an image-processing item display region 60, an operation input region 61, and an indicator 62.

The image-processing item display region 60 displays items of image processing executed in the auto-mode reading. More specifically, an item "determination as to kind of original" represents a process executed before main reading of the original. In the process described herein, "film" is determined as the kind of the original. Examples of correction for image data, which is obtained by reading the original, include "Auto Tone", "Unsharp Mask", "Fading Correction", "Grain Correction", "Backlight Correction", "Red-Eye Correction" and "Reduce Dust and Scratches". If "paper/photo" is determined as the kind of the original, other one or more processes, e.g., "Descreen", are added. In other words, when a newspaper or a photo in a magazine is the original, the item "Descreen" is turned "ON". In the image-processing item display region 60, optimum processing items are selected and displayed depending on the kind of the original.

The operation input region 61 is used when the user manually selects the processing items to be executed in the auto-mode reading. The indicator 62 indicates, for example, the item of the image processing under execution at that time during the auto-mode reading.

The user interface C21 is displayed such that the user can read a list of items of the image processing to be executed in the auto-mode reading from that time and can confirm in which part of the entire list of items the image processing is being executed at that time. A box representing "ON"/"OFF" setting is displayed in double lines for each of the image processing items which have already been executed and which are scheduled to be executed from that time. Of the image processing items, unnecessary ones are turned "OFF" in the operation input region 61 by the user in advance.

The image processing item having been tuned "OFF" in the operation input region 61 is not executed when the original is actually scanned in the auto-mode reading. Therefore, the image processing item not desired by the user is not executed.

After the completion of the auto-mode reading, the result of the image processing executed in the auto-mode reading through the user interface C21 is stored. Thus, the user can confirm the history of the stored image processing result, an image after the image processing, and the original together. Based on the confirmation, the user can additionally execute other image processing in an optional manner.

Third Exemplary Embodiment

Figure 8:
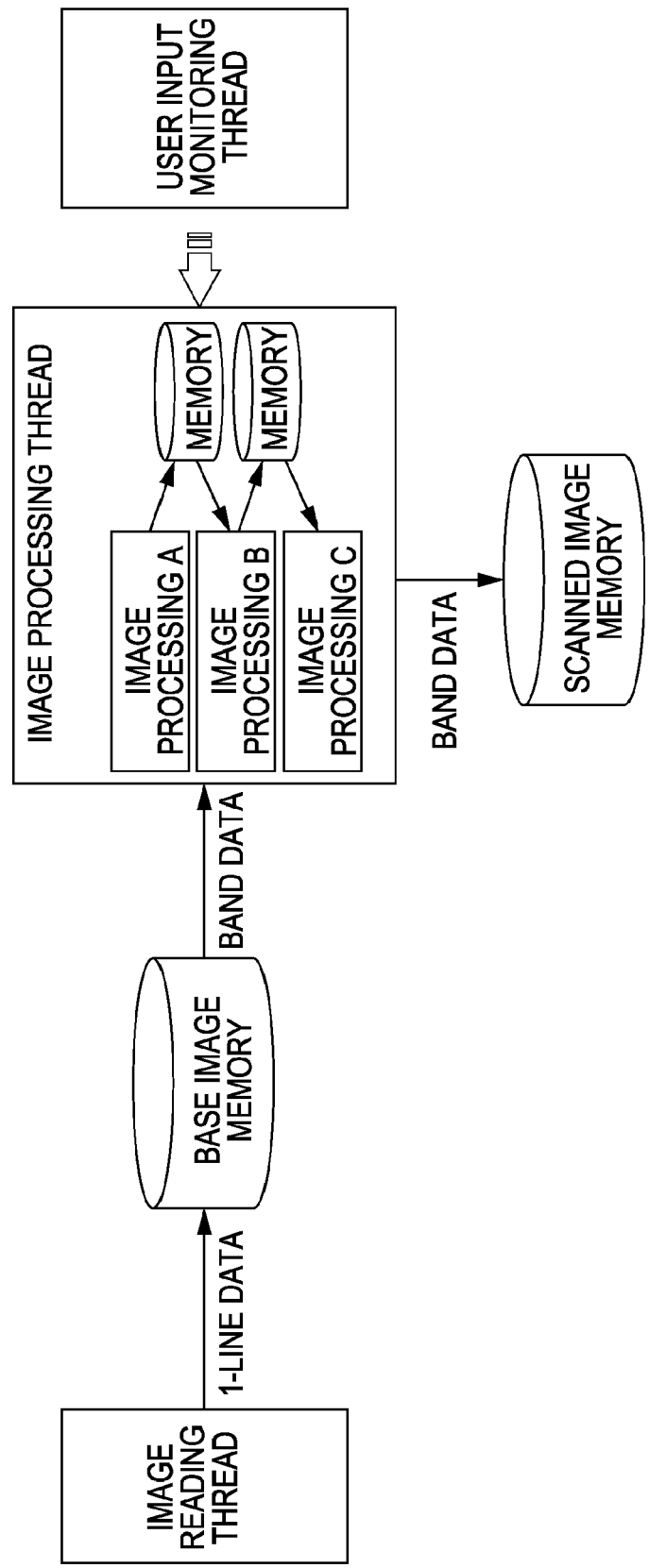
FIG. 8 is a block diagram illustrating the operation during a scanning process in a third exemplary embodiment of the present invention.

FIG. 8 is a block diagram illustrating the operation during a scanning process in a third exemplary embodiment of the present invention.

When image reading is started, an image reading thread, an image processing thread, and a user input monitoring thread are executed in parallel as shown in FIG. 8.

The image reading thread executes processing to read an image and write the read image into a base image memory of the host PC 221 from the scanner main unit 101 one line by one line.

The image processing thread executes processing to read a band data covering a certain number of lines with a certain width from the base image memory and to execute the selected items of the image processing in a successive manner. On that occasion, the data is temporarily written in a memory during an interval between two successive items of the image processing. More specifically, when one item of the image processing is completed, resulting data is temporarily written in the memory. For a next item of the image processing, the data is read out from the temporarily written memory and the image processing is executed on the read-out data.

The user input monitoring thread executes processing to monitor the presence of a user input during the image reading and to further monitor what the user input means.

FIG. 9 illustrates a user interface 600 of a driver application, which is presented during image reading by the scanner main unit in the third exemplary embodiment.

When the image reading is started, the user interface 600 of the driver application, shown in FIG. 9, is displayed. The driver-application user interface 600 presented during the image reading by the scanner main unit has a main-scan read image display region 601, a group of buttons 602 for changing the read setting and the setting of the image processing, and a dialog (box) 603 indicating the status of progress of the image reading. The main-scan read image display region 601 displays the image under the scanning corresponding to an image area scanned.

When the user wants to change the read setting and/or the setting of the image processing upon looking at the main-scan read image display region 601 during the image reading, the user selects, from among the group of buttons 602 for changing the read setting and the setting of the image processing, one or more buttons corresponding to the setting to be changed. As a result, the selected read setting and/or the selected setting of the image processing is changed. In FIG. 9, the button corresponding to the selected setting is displayed in double lines.

If the setting change input by the user requires read resolution to be increased, the image reading thread and the image processing thread are both returned to a start process of the image reading, and the image reading is executed again from the beginning.

If the user changes the setting of the image processing that is first executed, the image reading thread is continuously executed as it is. On the other hand, the image processing thread is returned to a start process. Then, data is read out from the base image memory from a first set of data so as to execute again the selected items of the image processing in a successive manner.

If the user changes the setting of the image processing and the changed item of the image processing is not one that is first executed, the image processing thread is returned to a process immediately before the changed item of the image processing, and succeeding items of the image processing are executed again. The image reading thread is continuously executed as it is.

The memory used to temporarily store data in the image processing thread is not always required to hold data for all the items of the image processing, and data of quickly-executed image processing may not be held in the temporarily storing memory for the purpose of memory saving.

If the user changes the image read setting and/or the setting of the image processing, an image reflecting the setting change is displayed again on the main-scan read image display region 601.

As described above, in the auto-mode reading, the status dialog is displayed to indicate the current status of the scanning in the auto-mode, while the list of the items of image processing executed in the auto-mode reading is displayed in the user interface 600. Further, the buttons for the manual operation by the user are prepared to provide such a mode that the user can press one or more of the buttons to choose unnecessary items of the image processing during the course of the auto-mode reading process, whereby the chosen items of the image processing are skipped. After the skipping, the scanning is continued in accordance with the desired items of the image processing.

Thus, according to the third exemplary embodiment, an image scanning apparatus capable of skipping the unnecessary items of the image processing and more quickly executing the scanning can be realized without not only increasing the cost, but also changing the construction of the known image scanning apparatus.

Further, according to the third exemplary embodiment, for a process taking a time to automatically execute the process in the auto-mode reading in the image scanning apparatus, e.g., the process of determining whether the original is a reflective original and a transmissive original, the current status of the process is displayed in the form of a dialog during the scanning in the auto-mode.

With the provision of the button for switching to manual processing when the user desires the manual processing instead of the automatic determination process, if the user operates the button during the automatic determination process, the scanning is executed in accordance with the manual processing as per the user selection. Hence, the processing time can be cut.

In addition, for some other process taking a time, there is prepared such a mode that an operation input region for skipping the relevant process is provided in the dialog indicating the current status, and the scanning is executed in accordance with the operation input from the user. As a result, the scanning can be more quickly performed without executing the unnecessary items of the image processing.

Moreover, an image scanning apparatus capable of avoiding a failure in the scanning caused by an error in the automatic original determination process in the auto-mode can be realized without not only increasing the cost, but also changing the construction of the known image scanning apparatus.

In the above-described exemplary embodiments, the image reading system is made up of the image scanning apparatus and the computer. However, the image reading system can also be constituted as an MFP (Multi Function Peripheral) which has functions of image reading and a printer and which includes an operation-aid display unit for executing control of the image reading and copying/printing by alone.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2006-336363 filed Dec. 13, 2006, which is hereby incorporated by reference herein in its entirety.

What is claimed is:

1. A control method for an image reading system comprising an image scanning apparatus configured to selectively read an original placed on an original plate as a reflective original or a transmissive original, an image processing apparatus configured to receive image data read by the image scanning apparatus and to execute image processing of the image data, and an operating unit and a display unit configured to be able to operate the image scanning apparatus and the image processing apparatus, the control method comprising:

selecting an auto-mode operation of automatically determining whether the original placed on the original plate is the reflective original or the transmissive original, executing reading of the original, and image processing;

determining whether the original placed on the original plate is the reflective original or the transmissive original in the auto-mode operation;

accepting a user input whether the original placed on the original plate is the reflective original or the transmissive original during the determination in the auto-mode operation;

executing reading of image data from the reflective original or the transmissive original in accordance with the determination in the auto-mode operation independent of the user input, or if the above user input is performed, in accordance with the user input instead of the automatic determining during the auto-mode operation;

processing the read image data;

displaying, in the display unit, details of processing executed in the determining and the image processing; and inputting an instruction to change the details of displayed processing, wherein when the change instruction input instructs change of a process under execution or having been already executed, the image processing is executed again from the changed process, wherein the displaying includes displaying a list of items of the image processing and also displays the item of the image processing currently under the execution, if the user input includes selecting an item from the list of items that changes the image processing under execution, it is possible to cancel the image processing under execution and return to a start process to execute image processing based on the selected item.

2. The control method for the image scanning apparatus according to claim 1, wherein the image processing includes at least one of Auto Tone, Unsharp Mask, Fading Correction, Grain Correction, Backlight Correction, Red-Eye Correction, Reduce Dust and Scratches, and Descreen.

3. The control method for the image scanning apparatus according to claim 1, wherein the displaying step displays processing items based on a determination result.

4. A control method for an image reading system comprising an image scanning apparatus configured to read an original and to obtain image data, an image processing apparatus configured to execute image processing of the image data, and an operating unit and a display unit configured to be able to operate the image scanning apparatus and the image processing apparatus, the control method comprising:

selecting an auto-mode operation of automatically reading, setting and image processing;

reading the original by the image scanning apparatus with a read setting when the auto-mode operation is selected;

setting, based on the image data read in the reading step, details of the image processing executed on the image data;

processing the image data in accordance with the set details set;

displaying read setting of the reading process and the set details; and inputting an instruction for change of the setting based on display of the read setting and the set details, wherein, when the change instruction input instructs change of the read setting, the reading process is executed from the beginning in the changed read setting, when the change instruction input instructs change of setting for a process under execution or having been already executed, the image processing is executed again from the setting-changed process, and when the change instruction input instructs change of setting for a process to be executed subsequently, the image processing is executed in accordance with the changed setting, wherein the displaying includes displaying read items of the image processing and also displays the item of the image processing currently under the execution, if the user input includes selecting a read item from the displayed read items that changes the image processing under execution, it is possible to cancel the image processing under execution and return to a start process to execute image processing based on the selected item.

5. The control method for the image scanning apparatus according to claim 4, wherein the image processing includes at least one of Auto Tone, Unsharp Mask, Fading Correction, Grain Correction, Backlight Correction, Red-Eye Correction, Reduce Dust and Scratches, and Descreen.

6. The control method for the image scanning apparatus according to claim 4, wherein the displaying includes displaying processing items based on a determination result.

7. A control program stored on a non-transitory computer-readable medium for an image reading system comprising an image scanning apparatus configured to be able to selectively read an original placed on an original plate as a reflective original or a transmissive original, an image processing apparatus configured to receive image data read by the image scanning apparatus and to execute image processing of the image data, and an operating unit and a display unit configured to be able to operate the image scanning apparatus and the image processing apparatus, the control program comprising:

computer-executable instructions for selecting an auto-mode operation of automatically determining whether the original placed on the original plate is the reflective original or the transmissive original, executing reading of the original, and image processing;

computer-executable instructions for determining whether the original placed on the original plate is the reflective original or the transmissive original in the auto-mode operation;

computer-executable instructions for accepting a user input whether the original placed on the original plate is the reflective original or the transmissive original during the determination in the auto-mode operation;

computer-executable instructions for executing reading of image data from the reflective original or the transmissive original in accordance with the determination in the auto-mode operation independent of the user input, or if the above user input is performed, in accordance with the user input instead of the automatic determining during the auto-mode operation;

computer-executable instructions for processing the read image data;

computer-executable instructions for displaying, in the display unit, details of processing executed in the determining and the image processing; and computer-executable instructions inputting an instruction to change the details of the displayed processing, wherein when the change instruction input instructs change of a process under execution or having been already executed, the image processing is executed again from the changed process, wherein the displaying includes displaying a list of items of the image processing and also displays the item of the image processing currently under the execution, if the user input includes selecting an item from the list of items that changes the image processing under execution, it is possible to cancel the image processing under execution and return to a start process to execute image processing based on the selected item.

8. A control program stored on a non-transitory computer-readable medium for an image reading system comprising an image scanning apparatus configured to read an original and to obtain image data, an image processing apparatus configured to execute image processing of the image data, and an operating unit and a display unit configured to be able to operate the image scanning apparatus and the image processing apparatus, the control program comprising:

computer-executable instructions for selecting an auto-mode operation of automatically reading, setting and image processing;

computer-executable instructions for reading the original by the image scanning apparatus with a read setting when the auto-mode operation is selected;

computer-executable instructions for setting, based on the image data read in the reading step, details of the image processing executed on the image data;

computer-executable instructions for processing the image data in accordance with the setting;

computer-executable instructions for displaying read setting of the reading process and the setting details of the image processing; and computer-executable instructions for inputting an instruction for change of the setting based on display of the read setting and the setting details, wherein, when the change instruction input instructs change of the read setting, the reading process is executed from the beginning in the changed read setting, when the change instruction input instructs change of setting for a process under execution or having been already executed, the image processing is executed again from the setting-changed process, and when the change instruction input instructs change of setting for a process to be executed subsequently, the image processing is executed in accordance with the changed setting, wherein the displaying includes displaying read items of the image processing and also displays the item of the image processing currently under the execution, if the user input includes selecting a read item from the displayed read items that changes the image processing under execution, it is possible to cancel the image processing under execution and return to a start process to execute image processing based on the selected item.

* * * * *